Figure 1:
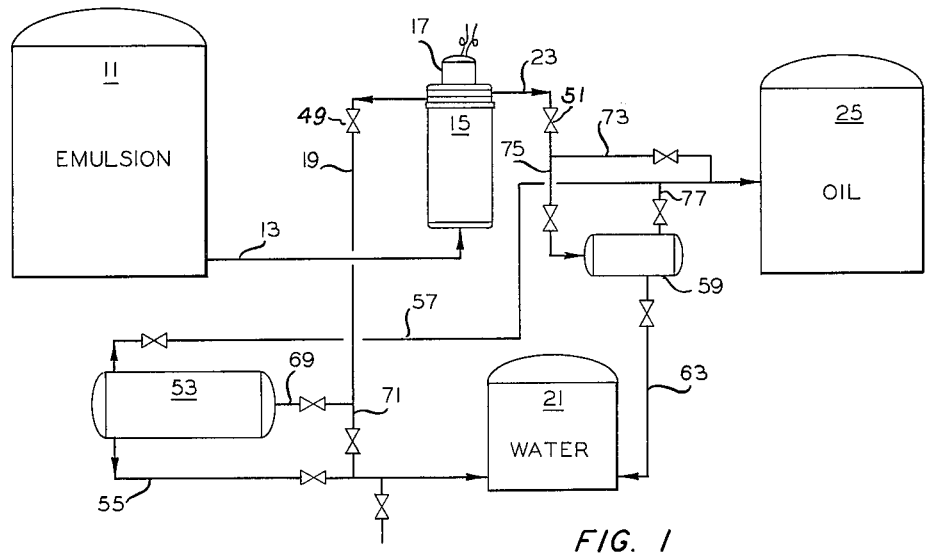

March 22, 1966   F. W. CRAWFORD   3,242,097
SEPARATION OF LIQUID PHASES
Filed April 27, 1961

INVENTOR.
F. W. CRAWFORD
BY Hudson & Young
ATTORNEYS

United States Patent Office 3,242,097
Patented Mar. 22, 1966

3,242,097
SEPARATION OF LIQUID PHASES
Francis W. Crawford, Manhattan, Kans., assignor to Phillips Petroleum Company, a corporation of Delaware
Filed Apr. 27, 1961, Ser. No. 106,060
16 Claims. (Cl. 252—325)

This invention relates to separation of liquid phases. In one aspect it relates to apparatus and a method for separation of emulsions into their constituent liquid phases. In another aspect it relates to a method and apparatus for breaking oil-water emulsions.

The emulsions mainly referred to herein consist of mixtures of oil and water. Such mixtures comprise one of these liquids in a very finely divided state of subdivision with the particles thereof suspended in the other liquid. The finely divided particles are frequently termed the suspended phase or the dispersed phase and the suspending liquid is frequently referred to as the continuous phase. In crude oil production work the emulsions are ordinarily water droplets suspended in crude oil. In refining operations emulsions can be of either type, that is, water droplets suspended in oil or oil droplets suspended in water. However, ordinarily in refining as well as in the oil fields the emulsions are finely divided water droplets suspended in oil. Oil field emulsions and many refinery emulsions are frequently very difficult to resolve into their component liquids.

Various methods are employed for breaking oil-water emulsions. Many chemical reagents are added to emulsions for resolving them into their constituent liquids. Such methods obviously consume chemicals. Other methods for breaking oil-water emulsions involve heating of the emulsions with or without the addition of chemicals. Still other methods involve passing of the emulsions through fixed beds of filter material. In general, oil-water emulsions are difficult to break and prior art processes leave much to be desired.

An object of this invention is to provide a method and apparatus for resolving emulsions into their constituent liquids. Another object of this invention is to devise or to provide apparatus and methods for breaking oil-water emulsions. Still another object of this invention is to provide apparatus and a method for breaking hydrocarbon oil, such as crude oil, and water emulsions. Still another object of this invention is to devise apparatus and a method for breaking oil-water emulsions which do not require use of chemicals. Still another object of this invention is to devise a process which is simple and easy to operate for continuously breaking oil-water emulsions. Still other objects and advantages of this invention will be realized upon reading the following description which, taken with the attached drawing, forms a part of this specification.

This invention involves the use of a solid granular material disposed in the basket of a centrifuge for breaking oil-water emulsions. The emulsion is passed into the solid material in the revolving centrifuge and the heavy phase passes toward the periphery of the centrifuge while the specifically light phase passes to the center thereof. An important property of the solid material used as filler for the centrifuge basket is that the material is wettable by one of the liquids being separated. For example, anthracite coal particles as granular material when placed in a centrifuge basket are easily wettable by the oily constituents of an emulsion. This wettability assists in separation of the oily droplets from the suspending water in case the emulsion is an emulsion of oil droplets in water. In case the emulsion is a suspension of water droplets in oil, the oil is retained on the surfaces of the anthracite coal particles while the water droplets are allowed to pass in the direction of the periphery of the centrifuge for their accumulation and removal. Such a plastic material as a polyolefin, for example a polyethylene, serves well as an emulsion breaking material. Also, such materials as silica gel, alumina, bauxite and related materials are preferentially water wetted in the presence of oil and serve to collect water, particularly when water is the dispersed phase of an oil-water emulsion.

The solid material according to this invention is placed in the bowl or basket of a continuous flow centrifuge in which the gross flow direction is perpendicular to the centrifuge force. If the wetting liquid is the more dense it will "settle out" in the direction of the forced field, downward for gravity, outward for centrifugal fields. If the wetting liquid is the less dense, it will flow upward in gravity fields and inward in the centrifugal force fields. In all cases the direction of flow in the separated liquids is transverse to the direction of flow of the feed stream. The path through the granular material parallel to the feed stream direction should, in general, be longer than the transverse path.

Figure 2:
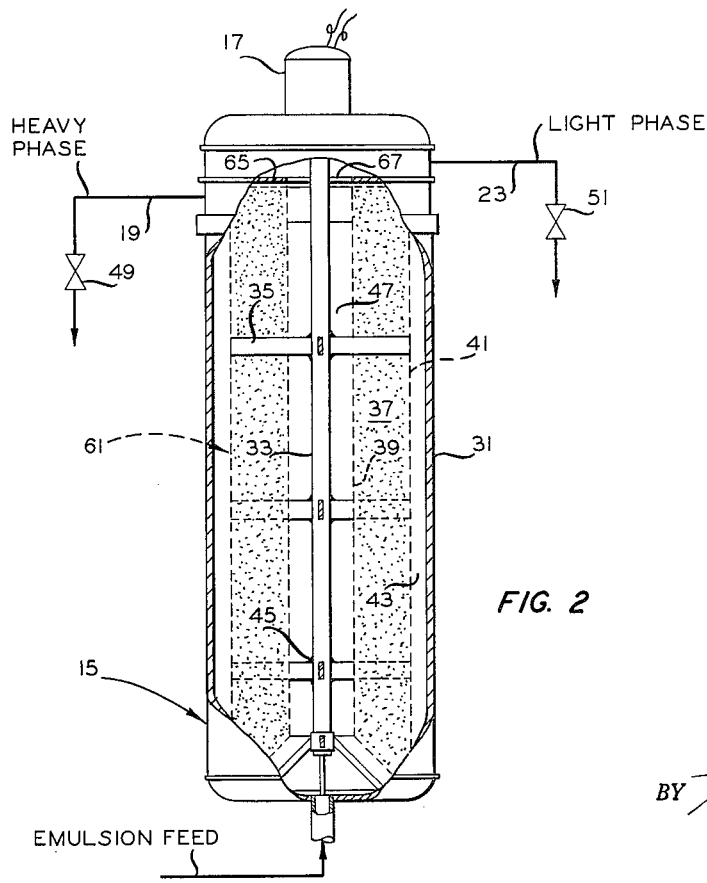

In the drawing, FIGURE 1 illustrates in diagrammatic form an arrangement of apparatus parts for carrying out the process of this invention. FIGURE 2 illustrates an elevational view, partly in section, of a portion of the apparatus of FIGURE 1.

In the drawing and specifically in FIGURE 1, reference numeral 11 identifies a tank in which an oil-water emulsion is present prior to its passage to the processing apparatus of this invention. This emulsion from tank 11 is passed through a conduit 13 into a centrifuge 15. Water, or heavy phase, separated in centrifuge 15 is passed through conduits 19 and 71 and through a conduit 55 into a water storage tank 21.

Oil separated in centrifuge 15 passes therefrom by way of a conduit 23 and flows through a conduit 73 into an oil storage vessel 25.

Under some conditions there may be small quantities of oil pass from the centrifuge in conduit 19 and under this condition the valve in conduit 71 is closed and the valve in conduit 69 is open. From conduit 69 this material passes into a tank 53 and the material is given an opportunity to phase separate for the removal of the oil as an upper phase from the water as a lower phase. The water is withdrawn from tank 53 through conduit 55, with a valve therein being open, into tank 21. The oil phase which floats upon the water in tank 53 is removed through a conduit 57 for passage into the oil storage vessel 25.

In case the oil leaving the centrifuge 15 through conduit 23 contains some water, the oil is passed through conduit 75 into a separating tank 59 to permit an oil phase to separate from the water. The oil thus separated is withdrawn from tank 59 and is passed through a conduit 75 into the storage vessel 25 while the water is passed through a conduit 63 to the water-containing vessel 21.

In FIGURE 2, which illustrates one form of a centrifuge on an enlarged scale, motor 17 mounted on centrifuge housing 31 rotates drive shaft 33 to which working parts of this centrifuge are attached. To the drive shaft 33 are attached as by welds 45 a number of support members 35, which are positioned radially with respect to the shaft 33. To these support members is attached an inner perforate wall member 39 which is a portion of the solid material-containing cage or basket 61. To the outer ends of the support members 35 is attached the outer perforate wall member 41 of the cage. With inner perforate wall member 39 and the outer perforate wall member 41 positioned as illustrated in FIGURE 2, a space is provided between these wall members for accommodation of a granular material used in this invention. These wall members provide between them an annular space and this annular space is closed at both ends so as to contain a solid packing material 37 filling basket 61, illustrating a compact bed or body of contact material. The diameter of the outer perforate wall member 41 is slightly smaller than the inner diameter of the centrifuge wall or case 31 so as to provide a channel or space 43 for passage of the heavy phase separated from the emulsion to the outlet end of the apparatus. Space 43 communicates with conduit 19 for outlet of the heavy phase. The diameter of the inner perforate wall member 39 is somewhat greater than the diameter of shaft 33 so as to provide a channel or space 47 for passage of the specifically light phase toward the outlet end of the apparatus. Positioned immediately above the upper closed end of the cage 61 is a plate 65. This plate serves as a separator between the heavy phase containing space 43 and the light phase containing space 47 at the upper end of the centrifuge. Plate 65 is provided with an opening 67 of about the same diameter as the diameter of the inner perforate wall member 39. This opening is provided so that liquid passing upward through space 47 can flow toward its outlet. Conduit 23 communicates with this end of the apparatus for outlet of the light phase. Valves 49 and 51 are positioned respectively in conduits 19 and 23 for the careful regulation of the rate of flow of the separated liquids from the centrifuge.

In the drawing reference numeral 21 identifies a tank in which the water separated from an emulsion is stored. Obviously such storage is not necessary in many operations and when desired conduit 55 may discharge water to a sewer or to other suitable disposal as desired. Furthermore, conduit 19, through which water passes from the centrifuge, may also discharge its flow to a sewer or such other disposal as desired under the conditions that the water does not contain any of the other phase desired to be separated in the centrifuge.

The solid granular material used in this apparatus for any given application is selected to be wetted by the material in the disperse phase of the emulsion. For example, if an oil field emulsion which is a suspension of water droplets in oil is to be resolved, the solid granular materials selected for use should be that which is wetted by water preferentially. Thus, for breaking of oil field emulsions the granular material should be such as silica gel, alumina, bauxite or the like. If the emulsion to be broken is an emulsion of oil droplets suspended in water, for example some of the emulsions formed in oil processing refineries, then the solid material should be such as anthracite coal or polyolefin resins. However, selection of the solid material to be used may be the reverse depending on conditions. For example, it may be desired to retain oil in the bed of solid material so that it can be forced toward the center of the centrifuge while allowing the suspended water droplets, due to their higher specific gravity, to be centrifugally forced toward the periphery of the granular material. In this case, then, it is desired to use an oil wettable material such as the above-mentioned anthracite coal or polyolefin material. These materials are preferentially wetted by oil in the presence of water and allow more or less retention of the oil while the water droplets tend to move outward through the spinning bed of the solid material.

Conversely, if a body of water contains finely divided, suspended oil droplets the solid material used in the centrifuge can be the above-mentioned silica gel, alumina, or bauxite. In this case, water wets the surface of such solid materials to the exclusion of the droplets of oil. In this case, the droplets of oil are free to move under the magnified effect of gravity in the centrifuge toward the center thereof.

As is well known in centrifugal operations the separation effect is related to the diameter of the revolving basket and to its speed of revolution. The over-all effect is frequently described in terms, of $g$, this letter standing for gravity. In centrifugal operations the number of $g$'s caused by the high speed of the rotating members of the apparatus effective $g$'s may be as high as 50, 100 or even more. In this present case the speed of rotation of the granular material and the diameter thereof are such that the effective $g$ is preferably about 100. However, suitable separations can be made within the range of from about 50 to 150 $g$'s.

Normally, when operating to separate an oil-water emulsion the water, being the heavy phase, separates and moves to the annulus or space 43 for removal from the system. The oil, being the lighter phase of the two, is forced toward the center of the rotating apparatus and it passes through the channel or space 47 for removal from the system through conduit 23.

In making a given separation of an oil-water emulsion, it is advantageous to analyze beforehand the feed stock for the relative contents of the oil and water. The valves 49 and 51 will be adjusted so as to permit flow of liquids through conduits 19 and 23, respectively, in the ratio in which these liquids are contained in the feed stock. Obviously, the manipulation of valves 49 and 51 is made taking into consideration the rate of introduction of feed emulsion into the apparatus through conduit 13.

The polyolefin oil-wettable material disclosed hereinabove can be a polyethylene or other polyolefin.

The solid granular material used in this invention is of a size in the range 10 to 100 mesh (U.S. Standard Screen sizes), preferably 10 to 50 mesh.

*Specific example*

As a specific example of the process of this invention is the following: 3,000 barrels per day of a water-crude oil emulsion comprising ⅔ water and ⅓ oil are fed into a centrifuge packed with granules of a solid polyethylene of 14 to 20 mesh size at atmospheric temperature and pressure. The centrifuge is a commercially available centrifuge and in this example it is operated at about 500 r.p.m. From the centrifuge there are removed about 1200 barrels of oil containing water. This oil-water stream is passed to a gravity separator tank corresponding to tank 59 of the drawing. Water settles to the bottom and is withdrawn via conduit 63 while oil is withdrawn via conduit 77. About 1800 barrels of water containing some oil are withdrawn from the centrifuge and are passed via conduits 19 and 69 to a separator corresponding to separator 53. When given settling time an oil layer forms on the surface of the water and is removed via conduit 57. Water is removed from settler 53 via conduit 55. About 900 barrels of oil from settler 59 and 100 barrels of oil from settler 53 are passed to the oil storage tank 25 while about 300 barrels of water from settler 59 and 1700 barrels of water from settler 53 are withdrawn. Sufficient coagulation or coalescing occurs in the centrifuge that gravity settling is substantially complete in settlers 53 and 59 in several hours.

While certain embodiments of the invention have been described for illustrative purposes, the invention obviously is not limited thereto.

I claim:

1. A method for separating an emulsion comprising two immiscible liquid components of unlike specific gravities into said components comprising introducing said emulsion into a spinning zone revolving about its axis containing a compact bed of granular solid particulate material preferentially wetted by one of said components, withdrawing the heavier of said components from the radially outer periphery of said spinning zone and the lighter of said components from an area adjacent the axis of rotation of said zone as products of the operation.

2. A method for separating a hydrocarbon oil-water emulsion into a first component comprising said hydrocarbon oil and a second component comprising water, comprising the steps of introducing said emulsion into a spinning zone revolving about its axis containing a compact bed of a granular solid particulate material preferentially wetted by said oil, withdrawing a first product comprising principally water from an area of said zone of maximum centrifugal force and withdrawing a second product comprising principally said hydrocarbon oil from an area of said zone of minimum centrifugal force.

3. The method of claim 2 wherein said granular solid material is coal.

4. The method of claim 2 wherein said granular solid material is anthracite coal.

5. The method of claim 2 wherein said granular solid material is a polyolefin.

6. The method of claim 2 wherein said granular solid material is a polyethylene.

7. A method for separating a hydrocarbon oil-water emulsion into a first component comprising said hydrocarbon oil and a second component comprising water, comprising introducing said emulsion into a zone revolving rapidly about its axis, said zone containing a compact bed of a granular solid particulate material preferentially wetted by said oil; withdrawing a first intermediate product containing a higher concentration of water and a lower concentration of coalesced oil than said emulsion from the radially outer periphery of said zone; separating this intermediate product by gravity settling into separate water and oil phases; withdrawing a second intermediate product from the radially inward periphery of said zone; said second intermediate product containing a higher concentration of coalesced oil and a lower concentration of water than said emulsion; and separating this second intermediate product by gravity settling into separate water and oil phases.

8. A method for separating an emulsion of liquid component A and liquid component B which comprises introducing said emulsion radially inside of a spinning zone revolving about its axis comprising a tubular mass of closely packed granular solid particulate material preferentially wetted by component A so as to cause component A to concentrate in a first collection zone radially outside of said spinning zone and component B in a second collection zone radially inside said spinning zone; and separately withdrawing component A from said first collection zone and component B from said second collection zone.

9. The method of claim 8 wherein component A is of higher specific gravity than component B.

10. The method of claim 8 wherein component A is aqueous and component B is an oil.

11. The method of claim 8 wherein said granular solid is polyolefin of 10 to 100 mesh size.

12. The method of claim 8 wherein said granular solid is coal of 10 to 100 mesh size.

13. An apparatus for separating a mixture of two immiscible liquid phases of unlike specific gravities into said phases comprising, in combination, (1) a tubular vessel having its ends closed and its axis upright, (2) a pair of concentric perforate tubular members in said vessel coaxial therewith, spaced therefrom and from each other in such a manner as to provide a substantial first annulus therebetween, a second annulus between the outer member and the vessel wall, and a third annulus adjacent said axis;

(3) closure members closing the upper and lower ends of said first annulus;

(4) a compact body of solid particulate granular contacting material positioned in said first annulus substantially filling same to the top closure member, said granular material being preferentially wetted by one of said liquid phases;

(5) means for withdrawing a separated liquid from said second annulus;

(6) means for withdrawing another separated liquid from one end of said third annulus;

(7) means for introducing said mixture into the other end of said third annulus; and (8) means for supporting said perforate tubular members and said body of material as a unit in rotatable condition within said vessel.

14. The apparatus of claim 13 wherein said vessel is upright, (7) comprises an inlet communicating with the lower end of said third annulus, (5) comprises an outlet communicating with said second annulus, and (6) comprises an outlet communicating with the upper end of said third annulus.

15. The apparatus of claim 14 wherein said granular material is polyolefin of 10 to 100 mesh.

16. The apparatus of claim 14 wherein said granular material is coal of 10 to 100 mesh.

References Cited by the Examiner
UNITED STATES PATENTS

| | | | |
|---|---|---|---|
| 650,402 | 5/1900 | Laplace | 210—380 |
| 1,198,039 | 9/1916 | Krause | 252—324 |
| 1,373,773 | 4/1921 | Sharples | 252—349 |
| 1,484,167 | 2/1924 | Allien | 252—324 |
| 1,944,479 | 1/1934 | Loenen | 252—324 |
| 1,974,692 | 9/1934 | Robinson | 252—324 |
| 1,974,698 | 9/1934 | Loenen | 252—322 |
| 2,087,778 | 7/1937 | Nelin | 210—360 |
| 2,594,445 | 4/1952 | Keith | 252—360 |
| 2,863,829 | 12/1958 | Henke et al. | 210—266 |
| 2,907,717 | 10/1959 | Hunn | 252—325 |

OTHER REFERENCES

Clayton: Theory of Emulsions, Second Ed., published 1928 by P. Blakiston's Son & Co. of Philadelphia, Pa., pages 202 to 207.

JULIUS GREENWALD, *Primary Examiner.*

ALBERT T. MEYERS, *Examiner.*